US007818793B2

(12) United States Patent
Gouda et al.

(10) Patent No.: US 7,818,793 B2
(45) Date of Patent: Oct. 19, 2010

(54) SYSTEM AND METHOD OF FIREWALL DESIGN UTILIZING DECISION DIAGRAMS

(75) Inventors: Mohamed G. Gouda, Austin, TX (US); Xiang-Yang Alex Liu, Austin, TX (US)

(73) Assignee: The Board of Regents, University of Texas System, Austin, TX (US)

(*) Notice: Subject to any disclaimer, the term of this patent is extended or adjusted under 35 U.S.C. 154(b) by 1186 days.

(21) Appl. No.: 11/386,365

(22) Filed: Mar. 22, 2006

(65) Prior Publication Data
US 2006/0218280 A1 Sep. 28, 2006

Related U.S. Application Data

(60) Provisional application No. 60/664,341, filed on Mar. 23, 2005.

(51) Int. Cl.
*G06F 9/00* (2006.01)
(52) U.S. Cl. .................. 726/11; 709/223; 709/224; 709/225; 709/226
(58) Field of Classification Search ............... 726/11; 709/223–226
See application file for complete search history.

(56) References Cited

U.S. PATENT DOCUMENTS 5,461,574 A * 10/1995 Matsunaga et al. ............. 716/2

2004/0015799 A1 * 1/2004 Jain ................................ 716/5
2009/0106710 A1 * 4/2009 Teig et al. ....................... 716/2

OTHER PUBLICATIONS

Adi Attar, "Performance Characteristics of BDD-Based Packet Filters", pp. 1-135, Nov. 2001.*
Pankaj Gupta, "Algorithms for routing lookups and packet classification", pp. 1-223, Dec. 2000.*
Huibo Heidi, "Specification based firewall testing", pp. 1-36, May 2004.*
Mikkel Christiansen and Emmanuel Fleury, "An MTIDD Based Firewall Using Decision Diagrams for Packet Filtering", pp. 297-319, Oct. 2004.*
Ehab S. Al-Shaer and Hazem H. Hamed, "Design and Implementation of Firewall Policy Advisor Tools", pp. 1-21, Dec. 2004.*
Randal E. Bryant, "Graph-Based Algorithms for Boolean Function Manipulation", pp. 677-691, Aug. 1986.*
Karsten Strehl, "Interval Diagrams for Efficient Symbolic Verification of Process Networks", pp. 939-956.*

* cited by examiner

*Primary Examiner*—Christian LaForgia
*Assistant Examiner*—Canh Le
(74) *Attorney, Agent, or Firm*—Antony P. Ng; Dillon & Yudell LLP

(57) ABSTRACT

A system, method and computer-usable medium for designing a firewall to protect a data processing system. A user first specifies a firewall decision diagram. The firewall decision diagram is then reduced and marked. Finally, a firewall is generated from the marked firewall decision diagram.

12 Claims, 4 Drawing Sheets

SYSTEM AND METHOD OF FIREWALL DESIGN UTILIZING DECISION DIAGRAMS

PRIORITY CLAIM

The application claims the benefit of priority under 35 U.S.C. §119(e) from U.S. Provisional Application No. 60/664,341, entitled, "System and Method of Firewall Design Utilizing Decision Diagrams," filed on Mar. 23, 2005, which disclosure is incorporated herein by reference.

BACKGROUND OF THE INVENTION

1. Technical Field

The present invention relates generally to data processing systems. More particularly the present invention relates to protecting data processing systems. Still more particularly, the present invention relates to constructing firewalls that protect data processing systems.

2. Description of the Related Art

In the past, so-called "hackers" have accessed and compromised private networks through direct dialing of modems coupled to the private network. With the advent of the Internet, individuals, business, and government have discovered that communication between networks could be established via the Internet instead of relying on connections between private networks. However, connecting a private network to the Internet introduces significant security problems for the data stored on a private network.

When a private network is coupled to the Internet, hackers may utilize the Internet as a means of accessing the private network. Therefore, many businesses, individuals, and the government utilize protective software and/or hardware known as a "firewall" to protect the private network from unauthorized access. A firewall is typically a hardware and/or software module that provides secure access to and from the private network by examining any packet of data that attempts to enter or leave the private network at some entry point. Depending on the configuration of an individual packet, the firewall determines whether the packet should proceed on its way or be discarded. To perform this function, the firewall includes a sequence of rules, which are in the form <predicate>→<decision>, where <predicate> is a Boolean expression over the different fields of a packet, and the <decision> of this rule is an operation applied to the packet.

Those with skill in this art will appreciate that the design of a firewall involves the design of a sequence of rules, which is not an easy task. Often, designers modify existing firewalls by adding more rules to cover cases that were not anticipated in the original design. As more threats to a private network materialize, the firewall must be fortified with more rules. The increasing number of rules requires more processing for each packet that passes through the firewall. In the prior art, most research in the area of firewalls have been dedicated to developing efficient data structures that can decrease the time required to process each packet through the firewall rules. Examples of such data structures are tree data structures, area-based quadtrees, and fat inverted segment trees.

SUMMARY OF THE INVENTION

A system and method of designing a firewall to protect a data processing system are disclosed. A user first specifies a firewall decision diagram. The firewall decision diagram is then reduced and marked. Finally, a firewall is generated from the marked firewall decision diagram.

These and other features and advantages of the present invention will be described in, or will become apparent to those of ordinary skill in the art in view of the following detailed description of the preferred embodiments.

BRIEF DESCRIPTION OF THE FIGURES

The novel features believed characteristic of the invention are set forth in the appended claims. The invention itself, however, as well as a preferred mode of use, further objects and advantages thereof, will best be understood by reference to the following detailed description of an illustrative embodiment when read in conjunction with the accompanying drawings, wherein:

DETAILED DESCRIPTION OF A PREFERRED EMBODIMENT

The present invention discloses a system and method of designing a firewall to protect a data processing system. First, a user specifies a firewall decision diagram (FDD). The FDD can be expressed as a high-level graphical representation of a proposed firewall that illustrates how a packet would be processed by the proposed firewall, depending on the values of the fields in the packet. Then, the FDD is utilized to generate, reduce, and simplify a firewall to ensure a complete, consistent, and compact firewall design.

Figure 1A:
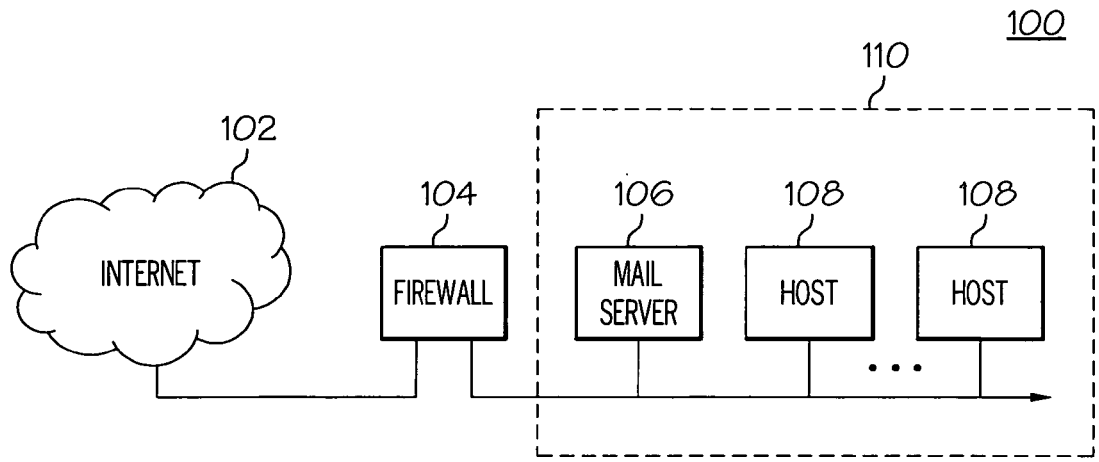
FIG. 1A is a block diagram depicting an exemplary network in which a preferred embodiment of the present invention may be implemented.

With reference now to the figures, and in particular, with reference to FIG. 1A, there is depicted a block diagram illustrating an exemplary network 100 in which a preferred embodiment of the present invention may be implemented. As illustrated, network 100 includes Internet 102, which is coupled to private network 110 via firewall 104. Internet 102 is an interconnected system of networks that connects computers around the world via the transmission control protocol/internet protocol (TCP/IP) protocol suite. Firewall 104 provides secure access to and from private network 110. Particularly, any packet that attempts to enter or leave private network 110 is first examined by firewall 104 and, depending on the settings of the different fields in the packet, firewall 104 determines whether to transmit or discard the packet.

Those with skill in this art will appreciate that packets may include any number of fields. These fields may include, but are not limited by:

S: the original source of the packet;
D: the ultimate destination of the packet;
P: the transport protocol of the packet; and
T: the destination port of the packet.

As previously discussed, firewall 104 includes a sequence of rules, each in the form of <predicate>→<decision>, where <predicate> is a Boolean expression over the different fields on the packet and <decision> is either "a" (for "accept") or "d" (for discard). To reach a decision concerning a packet, each of the rules in the sequence are examined until the first rule with a <predicate> that satisfies the packet fields is found. The <decision> is then applied to the packet.

In the depicted embodiment, private network 110 includes a mail server 106 and at least one host 108. If firewall 104 decides to accept an incoming packet, the packet is routed by firewall 104 or an associated router to either mail server 106 or host(s) 108 depending on the setting of the fields in the packet.

Figure 1B:
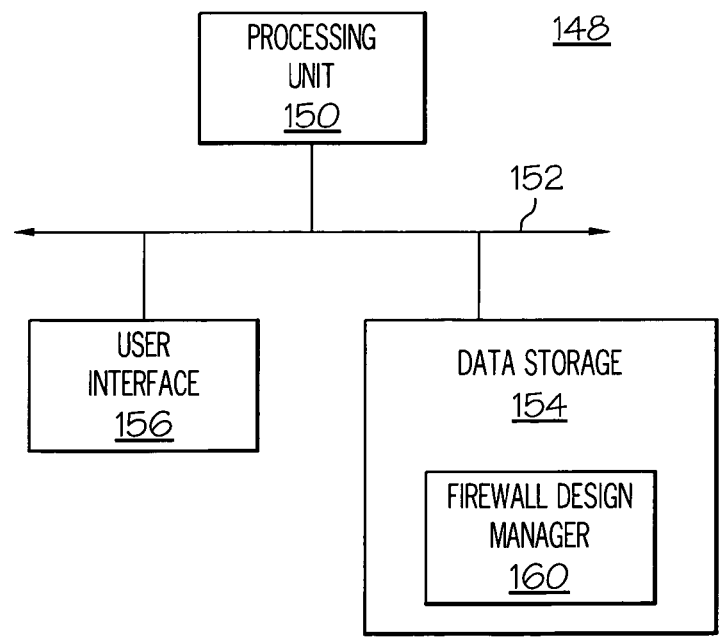
FIG. 1B is a block diagram illustrating an exemplary data processing system in which a preferred embodiment of the present invention may be implemented.

FIG. 1B is a block diagram depicting an exemplary data processing system 148 in which a preferred embodiment of the present invention may be implemented. Those with skill in the art will appreciate that firewall 104, mail server 106, or host(s) 108 may be implemented with a data processing system 148. Also, those with skill in the art will appreciate that the present invention is not limited to the representation of data processing system 148 illustrated in FIG. 1B, but may include any type of single or multi-processor data processing system.

As illustrated, data processing system 148 includes processing unit 150, data storage 154, and user interface 156 which are all coupled by interconnect 152. Data storage 154 may be implemented by any type of volatile or non-volatile memory such as read-only memory (ROM), random-access memory (RAM), any type of flash memory, optical memory, and magnetic storage. Also, as depicted, data storage 154 includes firewall design manager 160, which provides to a user a graphical user interface for constructing firewall rule sets, discussed herein in more detail.

Firewall Decision Diagrams (FDD):

A field $F_i$ is a variable whose value is taken from a predefined interval of nonnegative integers, called the domain of $F_i$ and denoted by $D(F_i)$.

A packet over the fields $F_0, \ldots, F_{n-1}$ is an n-tuple $(p_0, \ldots, p_{n-1})$ where each $p_i$ is taken from the domain $D(F_i)$ of the corresponding field $F_i$.

A firewall decision diagram f over the fields $F_0, \ldots, F_{n-1}$ is an acyclic and directed graph that satisfies the following conditions:

(1) f has exactly one node that has no incoming branches, call the "root of f", and has two or more nodes that have no outgoing branches, called the "terminal nodes of f".

(2) Each non-terminal node v in f is labeled with a field, denoted by F(v), taken from the set of fields $F_0, \ldots, F_{n-1}$. Each terminal node v in f is labeled with a decision that is either accept or "a" or discard or "d".

(3) A directed path from the root node to a terminal node in f is called a "decision path". No two nodes on a decision path in f have the same label.

(4) Each branch e that is an outgoing branch of a node v in f is labeled with an integer set I(e), where I(e) is a subset of the domain of field F(v).

(5) Let v be any terminal node in f. The set E(v) of all outgoing branches of node v satisfies the following two conditions:

(a) Consistency: For any distinct $e_i$ and $e_j$ in E(v), $I(e_i) \cap I(e_j) = \emptyset$ (b) Completeness:

$\cup_{e \in E(v)} I(e) = D(F(v))$, where $\emptyset$ is the empty set and D(F(v)) is the domain of the field F(v)

Figure 2:
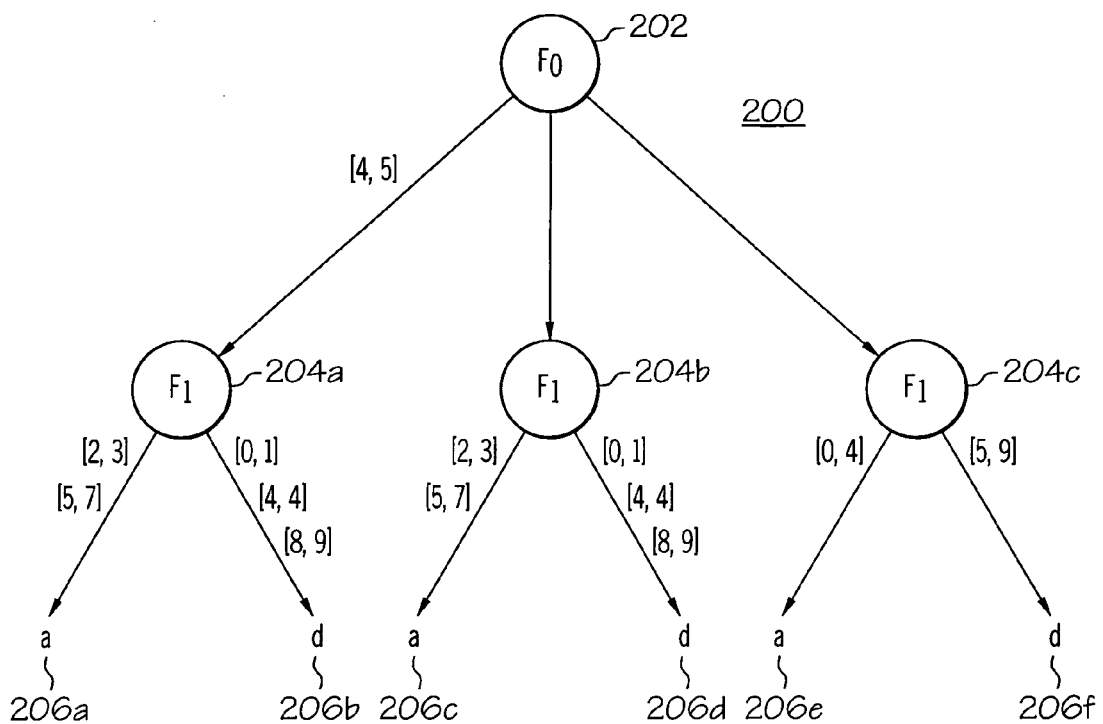
FIG. 2 depicts a firewall decision diagram according to a preferred embodiment of the present invention.

With reference now to FIG. 2, there is illustrated a firewall decision diagram (FDD) f 200 according to a preferred embodiment of the present invention. Firewall decision diagram f 200 is a pictorial representation of an exemplary firewall. As illustrated, firewall decision diagram f 200 includes two fields $F_0$ 202 and $F_1$ 204a-c. Nodes $F_1$ 204a-c branch out to terminal nodes 206a-f. Firewall decision diagram f 200 operates in a domain of interval [0,9], which represents the packet field domain. Those with skill in the art will appreciate that the packet domain field is not limited to [0,9], but can include any domain of any size. Each branch in firewall decision diagram f 200 is labeled with at least one set of integers that is represented by one or more non-overlapping intervals (that cover the set of integers). For example, one outgoing branch of the root is labeled with two intervals, [0,3] and [8,9] that represent the set {0,1,2,3,8,9}.

When f is a firewall decision diagram (similar to firewall decision diagram f 200), a decision path in f is expressed $(v_0 e_0, \ldots, v_{k-1} e_{k-1} v_k)$ where $v_0$ is the root node in f, $v_k$ is a terminal node in f, and each $e_i$ is a directed branch from node $v_i$ and node $v_{i+1}$ in f.

Each decision path $(v_0 e_0, \ldots, v_{k-1} e_{k-1} v_k)$ in firewall decision diagram f over the packet fields $F_0, \ldots, F_{n-1}$ can be represented as a rule of the form:

$$F_0 \in S_0 \wedge \ldots \wedge F_{n-1} \in S_{n-1} \rightarrow (\text{decision}),$$

where (decision) is the label of the terminal node $v_k$ in the decision path and each field $F_i$ satisfies one of the following conditions:

(1) No node in the decision path is labeled with field $F_i$ and $S_i$ is the domain of $F_i$.

(2) There is one node $v_i$ in the decision path that is labeled with field $F_i$ and $S_i$ is the label of branch $e_i$ in the decision path.

A firewall decision diagram f over the fields $F_0, \ldots, F_{n-1}$ can be represented by a sequence of rules, each of them in the form:

$$F_0 \in S_0 \wedge \ldots \wedge F_{n-1} \in S_{n-1} \rightarrow (\text{decision})$$

such that the following two conditions hold. First, each rule in the sequence represents a distinct decision path in firewall decision diagram f. Secondly, each decision path in f is represented by a distinct rule in the sequence. Note that the order of the rules in the sequence is immaterial.

The sequence of rules that represents firewall decision diagram f is hereinafter referenced as a "firewall" of firewall decision diagram f.

A packet $(p_0, \ldots, p_{n-1})$ over the fields $F_0, \ldots, F_{n-1}$ is determined to be accepted by firewall decision diagram f over the same fields if and only if a firewall of f has a rule:

$$F_0 \in S_0 \wedge \ldots \wedge F_{n-1} \in S_{n-1} \rightarrow \text{accept}$$

such that the condition $p_0 \in S_0 \wedge \ldots \wedge p_{n-1} \in S_{n-1}$ holds.

Also, a packet $(p_0, \ldots, p_{n-1})$ over the fields $F_0, \ldots, F_{n-1}$ is determined to be discarded by firewall decision diagram f over the same fields if and only a firewall of f has a rule:

$$F_0 \in S_0 \wedge \ldots \wedge F_{n-1} \in S_{n-1} \rightarrow \text{discard}$$

such that the condition $p_0 \in S_0 \wedge \ldots \wedge p_{n-1} \in S_{n-1}$ holds.

Let $\Sigma$ denote the set of all packets over the fields $F_0, \ldots, F_{n-1}$, and let f be a firewall decision diagram over the same fields. The accept set of f, represented by f.accept, is the subset of $\Sigma$ that contains all the packets accepted by f. Similarly, the discard set of f represented by f.discard, is the subset of Σ that contains all the packets discarded by f.

Therefore, for any firewall decision diagram f (such as firewall decision diagram f 200 of FIG. 2) over the fields $F_0, \ldots, F_{n-1}$,
1. f.accept∩f.discard=Ø, and
2. f.accept∪f.discard=Σ where Ø is the empty set and Σ is the set of all packets over the fields $F_0, \ldots, F_{n-1}$.

Two FDDs f and f' over the same fields are said to be equivalent iff they have identical accepts sets and identical discard sets, i.e., f.accept=f'.accept, and
f.discard=f'.discard.

Reduction of Firewall Decision Diagrams (FDD):

As previously described, the number of rules in a firewall of a firewall decision diagram f equals the number of decision paths in f. Thus, to promote more efficient processing of packets at the firewall, it is advantageous to reduce the number of decision paths in a firewall decision diagram without altering the accept and discard sets. The procedure for reducing the number of decision paths in a firewall decision diagram without changing the accept and discard sets is called a reduction of a firewall decision diagram.

Firewall decision diagrams may have isomorphic nodes. Two nodes $v_0$ and $v_1$ in a firewall decision diagram f are called "isomorphic in f" if and only if $v_0$ and $v_1$ satisfy one of the following two conditions:

(1) Both $v_0$ and $v_1$ are terminal nodes with identical labels in f; or
(2) Both $v_0$ and $v_1$ are non-terminal nodes with one-to-one correspondence between the outgoing branch of $v_0$ and the outgoing branch of $v_1$ such that every pair of corresponding branches have identical labels and are incoming branches of the same node in f.

A firewall decision diagram f is called a "reduced firewall decision diagram" if and only if it satisfies the following three conditions:

(1) f does not include a node with exactly one outgoing branch; or
(2) f has not two branches that are outgoing branches of one node and are incoming branches of another node; or
(3) f has no two distinct isomorphic nodes.

To reduce a firewall decision diagram, three reduction principles are repeatedly applied until one or more cannot be applied further:

(1) If f has a node $v_0$ with only one outgoing branch e and if e is an incoming branch of another node $v_1$, remove $v_0$ and e from f and make the incoming branches of $v_0$ the incoming branches of $v_1$.
(2) If f has two branches $e_0$ and $e_1$ that are outgoing branches of node $v_0$ and incoming branches of node $v_1$, remove $e_0$ and make the label of $e_1$ equal to the integer set $I(e_0) \cup I(e_1)$, where $I(e_0)$ and $I(e_1)$ are the integer sets that labeled branches $e_0$ and $e_1$, respectively.
(3) If f has two isomorphic nodes $v_0$ and $v_1$, remove node $v_1$ and its outgoing branches and make the incoming branches of $v_0$ incoming branches of $v_1$.

Figure 3:
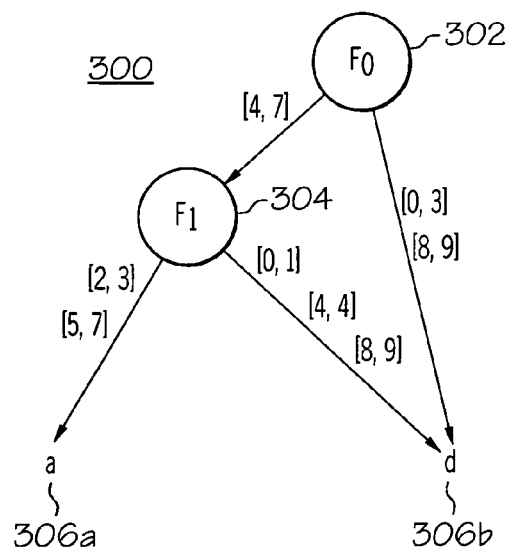
FIG. 3 illustrates a reduced firewall decision diagram according to a preferred embodiment of the present invention.

Referring to FIG. 3, there is depicted a reduced firewall decision diagram f 300 according to a preferred embodiment of the present invention. As illustrated, reduced firewall decision diagram f 300 includes root node 302 and non-terminal node 304. Also, terminal nodes 306a and 306b are coupled to non-terminal node 304 and root node 302. By applying the above-mentioned reduction principles, reduced firewall decision diagram f 300 is generated from firewall decision diagram f 200. While firewall decision diagram f 200 includes six decision paths, reduced firewall decision diagram f 300 includes only three decision paths.

Marking of Firewall Decision Diagrams (FDD):

As discussed later in more detail, "firewall simplification" involves replacing each rule in a firewall of a reduced firewall decision diagram f (such as reduced firewall decision diagram f 300) by a sequence of "simple" rules. The total number of the resulting simple rules in the firewall is less than or equal to the "degree" of a "marked version" of f.

A "marked version" f' of a reduced firewall decision diagram f is identical to f except that exactly one outgoing branch of each non-terminal node in f is marked "ALL". Therefore, f.accept=f'.accept and f.discard=f'.discard.

Figure 4A:
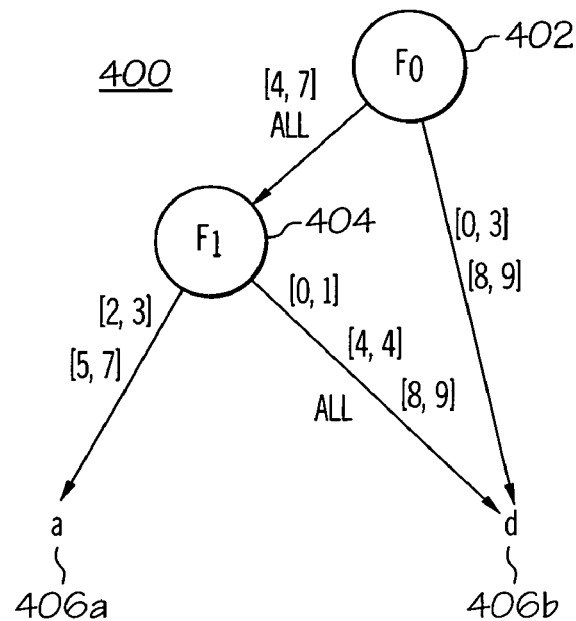
FIG. 4A depicts a first marked firewall decision diagram according to a preferred embodiment of the present invention.

Referring now to FIG. 4A, there is illustrated a marked firewall decision diagram f' 400 according to a preferred embodiment of the present invention. As illustrated, root node 402 is coupled to non-terminal node 404 and terminal node 406b. Also, terminal nodes 406a and 406b are coupled to root node 402 and non-terminal node 404 via a collection of branches. As depicted, the branch labeled [4,7] and the branch labeled [0,1][4,4][8,9] are both marked "ALL".

Figure 4B:
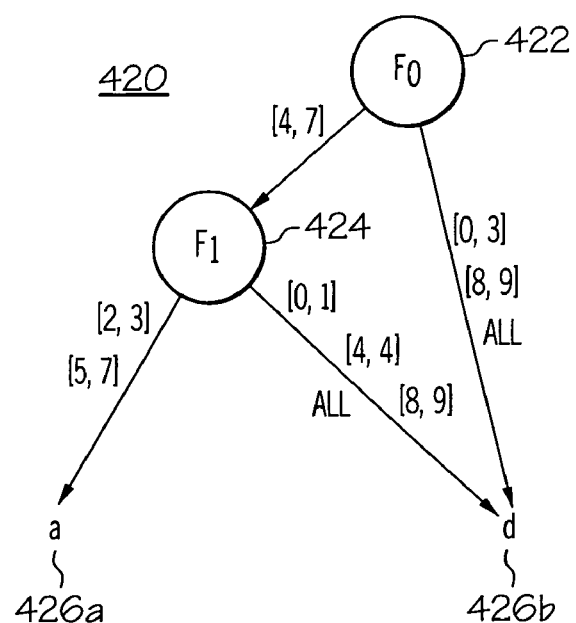
FIG. 4B illustrates a second marked firewall decision diagram according to a preferred embodiment of the present invention.

As discussed herein in more detail, a reduced firewall decision diagram may have many different marked versions and each marked version may have a different degree. With reference to FIG. 4B, there is depicted a marked firewall decision diagram f' 420 that includes root node 422, coupled to non-terminal node 424 and terminal node 426b. Terminal nodes 426a and 426b are coupled to root node 422 and non-terminal node 424 via a collection of branches. As illustrated, the branch labeled [0,3][8,9] and the branch labeled [0,1][4,4][8,9] are both marked "ALL".

The degree of a set of integers S, hereinafter expressed as deg(S), is the smallest number of non-overlapping integer intervals that cover S. For example, the degree of the set {0,1,2,4,7,8,9} is 3 because the set is covered by a minimum of three integer intervals [0,2], [4,4], and [7,9].

The degree of a branch e in a marked firewall decision diagram is hereinafter expressed as deg(e). If e is marked "ALL", then deg(e)=1. If e is not marked "ALL", then deg(e)=deg(S) where S is the set of integers that labels branch e.

The degree of a node v in a marked firewall decision diagram is hereinafter expressed as deg(v). If v is a terminal node, then deg(v)=1. If v is a non-terminal node with k outgoing branches $e_0, \ldots, e_{k-1}$ that are incoming branches of nodes $v_0, \ldots, v_{k-1}$ respectively, then:

$$deg(v) = \sum_{i=0}^{k-1} deg(e_i) \times deg(v_i)$$

The degree of a marked firewall decision diagram f is hereinafter expressed as deg(f) and equals the degree of the root node of f.

For example, deg(f')=5 where f' is the marked firewall decision diagram 400 in FIG. 4A, and deg(f'')=4 where f'' is the marked decision diagram 420 in FIG. 4B. As indicated from the above examples, a reduced firewall decision diagram may have many marked versions. Each marked version may also be characterized by a different degree. As previously discussed, the number of simple rules in the firewall of a marked firewall decision diagram is less than or equal to the degree of the marked firewall decision diagram. Therefore, it is advantageous to generate the marked version of the firewall decision diagram with the smallest possible degree, which is accomplished by the following steps:
(1) Computing the degree of each terminal node v in f as deg(v)=1.
(2) While f has a node v whose degree has not yet been computed and v has k outgoing branches $e_0, \ldots, e_{k-1}$ that are incoming branches of the nodes $v_0, \ldots, v_{k-1}$, respectively, whose degrees have already been computed, do:
  a. Find an outgoing branch $e_j$ of v whose quantity (deg $(e_j)-1)\times\deg(v_j)$ is larger than or equal to the corresponding quantity of every other outgoing branch of v.
  b. Mark branch $e_j$ with "ALL"
  c. Compute the degree of v:

$$deg(v) = \sum_{i=0}^{k-1}(deg(e_i) \times deg(v_i))$$

If the above-mentioned marking steps are applied to reduced firewall decision diagram f 300 of FIG. 3, marked firewall decision diagram f 420 of FIG. 4B is obtained.

Firewall Generation:

As previously discussed, a firewall r over fields $F_0, \ldots, F_{n-1}$ is a sequence of rules $r_0, \ldots, r_{m-1}$, where each rule is of the form:

$$F_0 \epsilon S_0 \wedge \ldots \wedge F_{n-1} \epsilon S_{n-1} \rightarrow (\text{decision})$$

Each $S_i$ is either the mark "ALL" or a non-empty set of integers taken from the domain of field $F_i$ (which is an interval of consecutive non-negative integers). The <decision> is either a (for accept) or d (for discard). The last rule, $r_{m-1}$, in firewall r is of the form:

$$F_0 \epsilon S_0 \wedge \ldots \wedge F_{n-1} \epsilon S_{n-1} \rightarrow (\text{decision})$$

where each $S_i$ is either the mark "ALL" or the entire domain of field $F_i$.

A packet $(p_0, \ldots, p_{n-1})$ over the fields $F_0, \ldots, F_{n-1}$ is said to "match" a rule $r_i$ in a firewall over the same fields if and only if rule $r_i$ is of the form:

$$F_0 \epsilon S_0 \wedge \ldots \wedge F_{n-1} \epsilon S_{n-1} \rightarrow (\text{decision})$$

and then condition $(p_0 \epsilon S_0 \wedge \ldots \wedge p_{n-1} \epsilon S_{n-1})$ holds.

A packet over the fields $F_0, \ldots, F_{n-1}$ is said to be "accepted" by a firewall r over the same fields if and only if r has a rule $r_i$ that satisfies the following three conditions:
(1) The packet matches $r_i$; and
(2) The packet does not match any rule that precedes $r_i$; and
(3) The <decision> of $r_i$ is a.

Also, a packet over fields $F_0, \ldots, F_{n-1}$ is determined to be "discarded" by a firewall r over the same fields if and only if r has a rule $r_i$ that satisfies the following three conditions:
(1) The packet matches $r_i$; and
(2) The packet does not match any rule that precedes $r_i$; and
(3) The <decision> of $r_i$ is d.

If r is a firewall over the fields $F_0, \ldots, F_{n-1}$ the set of all packets accepted by r is represented by r.accept and the set of all packets discarded by r is represented by r.discard. These principles can be summarized with the following theorem:

For any firewall r over the fields $F_0, \ldots, F_{n-1}$,
1. r.accept∩r.discard=⊘, and
2. r.accept∪r.discard=Σ where ⊘ is the empty set and Σ is the set of all packets over the fields $F_0, \ldots, F_{n-1}$.

To generate a firewall r from a marked firewall decision diagram f (e.g., marked firewall decision diagram f 420), a Firewall Generation Algorithm may be utilized, such that:
1. For each decision path in f, compute a rule $r_i$, its rank, its exhibited predicate $ep_i$ and its original predicate $op_i$ as follows:

$$F_n \epsilon S_0 \wedge \ldots \wedge F_{n-1} \epsilon S_{n-1} \rightarrow (\text{decision})$$

$$\text{rank} = b_0, \ldots, b_{n-1}$$

$$ep_i = (F_0 \epsilon S_0 \wedge \ldots \wedge F_{n-1} \epsilon S_{n-1})$$

$$op_i = (F_0 \epsilon S_0 \wedge \ldots \wedge F_{n-1} \epsilon S_{n-1})$$

where each $b_i, S_i$ and $T_i$ is computed according to the following three cases:
Case 1: (The decision path has no nodes labelled $F_i$)
  $b_i = 0$
  $S_i$ = the domain $[a_i, b_i]$ of $F_i$
  $T_i$ = the domain $[a_i, b_i]$ of $F_i$
Case 2: (The decision path has no nodes labelled $F_i$, and its outgoing edge e has no mark)
  $b_i = 0$
  $S_i$ = the integer set that labels e
  $T_i$ = the integer set that labels e
Case 3: (The decision path has no nodes labelled $F_i$, and its outgoing edge e has ALL mark)
  $b_i = 1$
  $S_i$ = ALL
  $T_i$ = the integer set that labels e
2. After computing all the rules and their ranks, order the rules in r in an ascending order of their ranks.

For example, if the above-mentioned steps are applied to marked firewall decision diagram f 420, the following firewall results.

--- r = ( $F_0 \in [4,7]$ ∧$F_1 \in [2,3]\cup[5,7]$ → a,
$F_0 \in [4,7]$ ∧$F_1 \in$ ALL → d,
$F_0 \in$ ALL ∧$F_1 \in [0,9]$ → d,
)

---

Associated with each of the three rules in firewall r are a rank, an exhibited predicate, and an original predicate. In particular, associated with the first rules are:
rank=00
exhibited predicate=$(F_0 \epsilon [4,7] \wedge F_1 \epsilon [2,3]\cup[5,7])$,
original predicate=exhibited predicate.
Associated with the second rule are:
rank=01
exhibited predicate=$(F_0 \epsilon [4,7] \wedge F_1 \epsilon \text{ALL})$,
original predicate=$(F_0 \epsilon [4,7] \wedge F_1 \epsilon [0,1]\cup[4,4]\cup[5,7])$.
Associated with the third rule are:
rank=10
exhibited predicate=$(F_0 \epsilon \text{ALL} \wedge F_1 \epsilon [0,9])$,
original predicate=$(F_0 \epsilon [0,3]\cup[8,9] \wedge F_1 \epsilon [0,9])$.

Firewall Compactness:

Firewalls generated by the Firewall Generation Algorithm may have redundant rules, which are rules that can be removed from the firewalls without affecting the accept or discard sets of these firewalls. For example, in the above-referenced firewall r, the second rule is redundant. Thus, removing this rule from r yields:

$$r' = ( F_0 \in [4,7] \wedge F_1 \in [2,3] \cup [5,7] \quad \to a,$$
$$F_0 \in ALL \wedge F_1 \in [0,9] \quad \to d, )$$

As previously discussed, r'.accept=r.accept and r'.discard=r.discard, so the firewalls are equivalent. A firewall is referred to as "compact" if and only if it has no redundant rules. Therefore:

If $(r_0, \ldots, r_{m-1})$ is a firewall over the fields $F_0, \ldots, F_{n-1}$, a rule $r_i$ in this firewall, I<m−1 is redundant if and only if for each j, i<j≦m−1, at least one of the following two conditions apply:

1. (decision) of $r_j$=(decision) of $r_i$.
2. No packet over the fields $F_0, \ldots, F_{n-1}$ satisfies the predicate $$r_i.op \wedge (\neg r_{i+1}.ep \wedge \ldots \wedge r_{j-1}.ep) \wedge r_j.ep$$

where $r_i$.ep denotes the original predicate of $r_i$ and $r_j$.ep denotes the exhibited predicate of $r_j$.

To compact a firewall r, the following "Firewall Compaction" steps are applied:

```
variables
    i           :0..m−2
    j           :0..m;
    redundant   :array [0..m−1] of boolean;
    np          :name of a predicate;
steps
    1. redundant[m−1] := false;
    2. for i=m−2 to 0 do
            j :=i+1
            let r_i.op be named np;
            redundant[i] := true
            while redundant[i] ∧ j ≦ m−1 do
                if redundant[j]
                    then j :=j+1;
                else if (<decision> of r_i = <decision> of r_j )
                        ∨ (no packet over the fields F_0, ...,
                           F_{n−1} satisfies np ∧ r_j.ep)
                    then let np ∧¬r_j.ep be named np;
                        j := j+1
                else redundant[i] :=false;
    3. Remove from r every rule r_i where
       redundant[i] :=true.
```

Firewall Simplification:

A firewall rule of the form:

$$(F_0 \in S_0 \wedge \ldots \wedge F_{n-1} \in S_{n-1}) \to (decision)$$

is called "simple" if and only if every $S_i$ in the rule is either the "ALL" mark or an interval of consecutive non-negative integers. A firewall is called "simple" if and only if all its rules are simple. The "Firewall Simplification" steps may be utilized to simplify a generated firewall such that:

while r has a rule of the form $$F_0 \in S_0 \wedge \ldots \wedge F_i \in S \cup [a,b] \wedge \ldots \wedge F_{n-1} \in S_{n-1} \to (decision)$$

where S is a nonempty set of nonnegative integers that has neither a−1 nor b+1 do
  replace this rule by two consecutive rules of the form:

$$F_0 \in S_0 \wedge \ldots \wedge F_i \in S \wedge \ldots \wedge F_{n-1} \in S_{n-1} \to (decision),$$

$$F_0 \in S_0 \wedge \ldots \wedge F_i \in [a,b] \wedge \ldots \wedge F_{n-1} \in S_{n-1} \to (decision),$$

end

If the above steps are applied to the following firewall r':

$$r' = ( F_0 \in [4,7] \wedge F_1 \in [2,3] \cup [5,7] \quad \to a,$$
$$F_0 \in [4,7] \wedge F_1 \in ALL \quad \to d,$$
$$F_0 \in ALL \wedge F_1 \in [0,9] \quad \to d, )$$

The following simple firewall f' results:

$$r = ( F_0 \in [4,7] \wedge F_1 \in [2,3] \quad \to a,$$
$$F_0 \in [4,7] \wedge F_1 \in [5,7] \quad \to d,$$
$$F_0 \in ALL \wedge F_1 \in [0,9] \quad \to d, )$$

Figure 5:
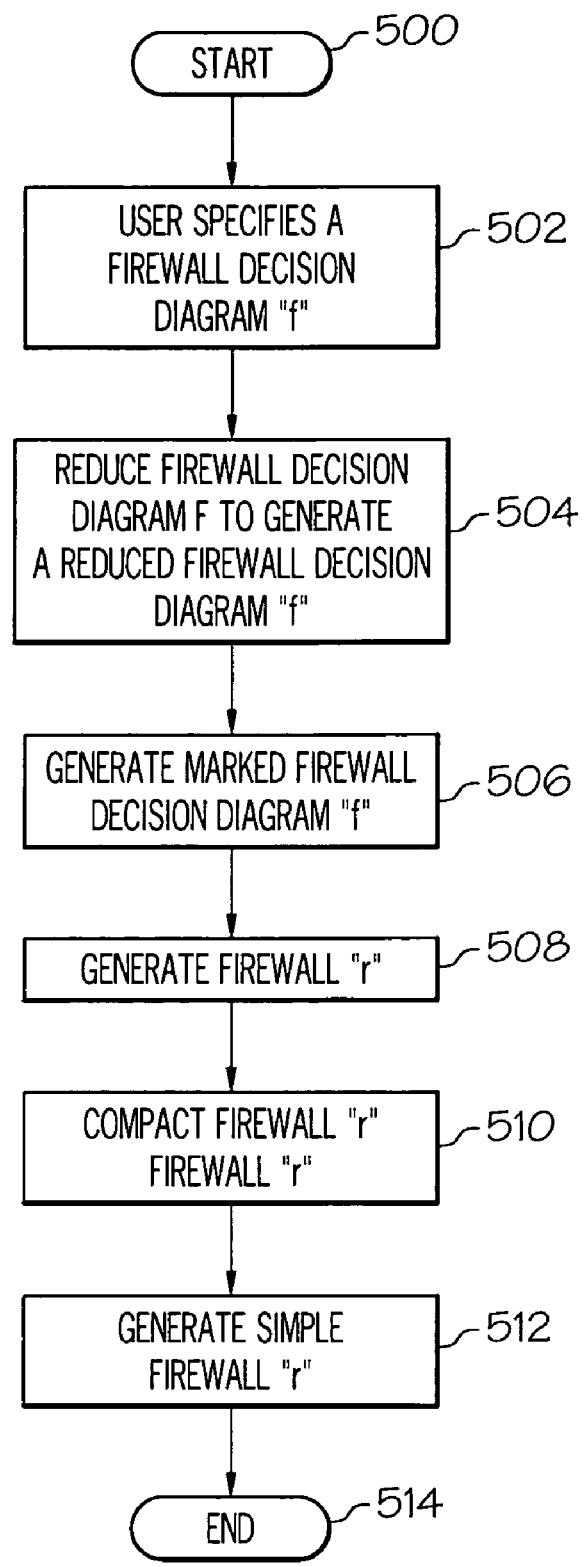
FIG. 5 is a high-level logical flowchart depicting a preferred method of designing a firewall for protecting a data processing system according to a preferred embodiment of the present invention.

Firewall Design Flow:

Referring now to FIG. 5, there is a high-level logical flowchart depicting a preferred method of designing a firewall to protect a data processing system according to a preferred embodiment of the present invention. The process starts at step 500 and continues to step 502, which depicts a user specifying a firewall decision diagram f, much like firewall decision diagram f 200. The consistency and completeness properties of f can be verified automatically by utilizing firewall design manager 160. Although firewall decision diagram f 200 can be considered consistent and complete, f should not be immediately utilized to generate a firewall r. The process then continues to step 504, which illustrates firewall decision diagram f 200 being reduced to generate a reduced firewall decision diagram f' 300.

Then, the process continues to step 506, which illustrates firewall design manager 160 processing reduced firewall decision diagram f' 300 to generate a marked firewall decision diagram f' such as marked firewall decision diagram f" 400 or 420. The process then continues to step 508, which depicts firewall design manager 160 generating firewall r from marked firewall decision diagrams 400 or 420. The process then continues to step 510, which depicts firewall design manager 160 generating compact firewall r' from firewall r. The process then continues to step 512, which illustrates firewall design manager 160 generating a simple firewall r" from compact firewall r'. The process then ends at step 514.

A system and method of designing a firewall to protect a data processing system are disclosed. A user first specifies a firewall decision diagram. The firewall decision diagram is then reduced and marked. Finally, a firewall is generated from the marked firewall decision diagram.

While this invention has been particularly shown as described with reference to a preferred embodiment, it will be understood by those skilled in this art that various changes in form and detail may be made therein without departing from the spirit and scope of the invention. It is also important to note that although the present invention has been described in the context of a fully functional computer system, those skilled in the art will appreciate that the mechanisms of the present invention are capable of being distributed as a program product in recordable type media such as compact discs.

What is claimed is:

1. A method for generating firewall rules by utilizing a data processing system, said method comprising:
   specifying a plurality of requirements for a software firewall in a firewall decision diagram;
   reducing said firewall decision diagram;
   marking said firewall decision diagram by
      computing a degree of each terminal node v as deg(v)=1;
      in response to a determination that a first node v having a plurality of outgoing branches $e_0, \ldots, e_{k-1}$ that are incoming branches of nodes $v_0, \ldots, v_{k-1}$, respectively, within said firewall decision diagram, and that an outgoing branch $e_j$ among said plurality of outgoing branches includes a quantity $(\deg(e_j)-1)\times\deg(v_j)$ that is larger than or equal to the corresponding quantity of every other outgoing branch among said plurality of outgoing branches of said first node v:
         marking branch $e_j$ with ALL; and
         computing the degree of said first node v utilizing $\deg(v)=\Sigma^{k-1}_{i=0}[\deg(e_i)\times\deg(v_i)]$, wherein k represents a number of outgoing branches in said plurality of outgoing branches; and
   generating a plurality of firewall rules based on said firewall decision diagram on said data processing system.

2. The method of claim 1, wherein said method further includes compacting said plurality of firewall rules by removing any redundant firewall rules.

3. The method of claim 1, wherein said specifying a plurality of requirements for a software firewall in a firewall decision diagram further includes:
   implementing a root node, wherein said root node has no incoming branches;
   including at least two terminal nodes, wherein said terminal nodes have no outgoing branches;
   labeling each terminal node with a decision; and
   describing each firewall rule within said firewall decision diagram as a distinct decision path from said root node to a one of said terminal nodes.

4. The method of claim 1, wherein said reducing said firewall decision diagram further includes:
   in response to a determination that a first node includes only one outgoing branch and a plurality of incoming branches and said one outgoing branch is an incoming branch of a second node, removing said first node and reassigning said plurality of incoming branches from said first node to said second node;
   in response to a determination that said firewall decision diagram includes a first branch $e_0$ and a second branch $e_1$ that are outgoing branches of said first node and incoming branches of said second node, removing said first branch and labeling said second branch equal to an integer set $I(e_0) \cup I(e_1)$, where $I(e_0)$ and $I(e_1)$ are integer sets that labeled said first branch and said second branch; and
   in response to a determination that said firewall decision diagram includes a first isomorphic node and a second isomorphic node, removing said first isomorphic node and outgoing branches associated with said first isomorphic node and assigning a plurality of incoming branches associated with said first isomorphic node to said second isomorphic node, wherein said first isomorphic node and said second isomorphic nodes are terminal nodes with identical labels or non-terminal nodes with one-to-one correspondence between an outgoing branch of said first isomorphic node and an outgoing branch of said second isomorphic node such that each pair of corresponding branches include identical labels and are incoming branches of a third node in said firewall decision diagram.

5. A data processing system comprising:
   a processor;
   an interconnect coupled to said processor; and
   a data storage having a firewall decision manager is configured for:
   specifying a plurality of requirements for a software firewall as in a firewall decision diagram;
   reducing said firewall decision diagram;
   marking said firewall decision diagram by
   computing a degree of each terminal node v as deg(v)=1;
   in response to a determination that a first node v having a plurality of outgoing branches $e_0, \ldots, e_{k\_}1$ that are incoming branches of nodes $v_o, \ldots v_{k-1}$ respectively, within said firewall decision diagram, and that an outgoing branch $e_j$ among said plurality of outgoing branches includes a quantity $(\deg(e_j)-1)\times\deg(v_j)$ that is larger than or equal to the corresponding quantity of every other outgoing branch among said plurality of outgoing branches of said first node v:
      marking branch $e_j$ with ALL; and
      computing the degree of said first node v utilizing $$\deg(v) = \sum_{i=0}^{k-1}[\deg(e_i)\times\deg(v_i)],$$

wherein k represents a number of outgoing branches in said plurality of outgoing branches; and
   generating a plurality of firewall rules based on said firewall decision diagram.

6. The data processing system of claim 5, wherein the firewall design manager is further configured for compacting said plurality of firewall rules by removing any redundant firewall rules.

7. The data processing system of claim 5, wherein said firewall decision diagram further includes
   a root node, wherein said root node has no incoming branches;
   at least two terminal nodes, wherein said terminal nodes have no outgoing branches;
   each terminal node with a decision; and
   each firewall rule within said firewall decision diagram is described as a distinct decision path from said root node to one of said terminal nodes.

8. The data processing system according to of claim 5, wherein said instructions for said reducing said firewall decision diagram further comprises instructions configured for:
   in response to a determination that a first node includes only one outgoing branch and a plurality of incoming branches and said one outgoing branch is an incoming branch of a second node, removing said first node and reassigning said plurality of incoming branches from said first node to said second node;
   in response to a determination that said firewall decision diagram includes a first branch $e_0$ and a second branch $e_1$ that are outgoing branches of said first node and incoming branches of said second node, removing said first branch and labeling said second branch equal to an integer set $I(e_o) \cup I(e_1)$, where $I(e_o)$ and $I(e_1)$ are integer sets that labeled said first branch and said second branch; and
   in response to a determination that said firewall decision diagram includes a first isomorphic node and a second isomorphic node, removing said first isomorphic node and outgoing branches associated with said first isomorphic node and assigning a plurality of incoming branches associated with said first isomorphic node to said second isomorphic node, wherein said first isomorphic node and said second isomorphic nodes are terminal nodes with identical labels or non-terminal nodes with one-to-one correspondence between an outgoing branch of said first isomorphic node and an outgoing branch of said second isomorphic node such that each pair of corresponding branches include identical labels and are incoming branches of a third node in said firewall decision diagram.

9. A non-transistors computer recordable-type medium having computer program product for generating firewall rules, said computer non-transistors recordable-type medium comprising:

program code for specifying a plurality of requirements for a software firewall in a firewall decision diagram;

program code for reducing said firewall decision diagram;

computer code for marking said firewall decision diagram by computing a degree of each terminal node v as deg(v)=1;

in response to a determination that a first node v having a plurality of outgoing branches $e_0, \ldots, e_{k-1}$ that are incoming branches of nodes $v_o, \ldots v_{k-1}$ respectively, within said firewall decision diagram, and that an outgoing branch $e_j$ among said plurality of outgoing branches includes a quantity $(\deg(e_j)-1) \times \deg(v_j)$ that is larger than or equal to the corresponding quantity of every other outgoing branch among said plurality of outgoing branches of said first node v:

marking branch $e_j$ with ALL; and computing the degree of said first node v utilizing $$\deg(v) = \sum_{i=0}^{k-1} [\deg(e_i) \times \deg(v_i)],$$

wherein k represents a number of outgoing branches in said plurality of outgoing branches; and program code for generating a plurality of firewall rules based on said firewall decision diagram.

10. The non-transistors computer recordable-type medium of claim 9, wherein said non-transistors computer recordable-type medium further includes program code for compacting said plurality of firewall rules by removing any redundant firewall rules.

11. The non-transistors computer recordable-type medium of claim 9, wherein said program code for expressing a plurality of requirements for a software firewall in a firewall decision diagram further includes:

program code for implementing a root node, wherein said root node has no incoming branches;

program code for including at least two terminal nodes, wherein said terminal nodes have no outgoing branches;

program code for labeling each terminal node with a decision; and program code for describing each firewall rule within said firewall decision diagram as a distinct decision path from said root node to a one of said terminal nodes.

12. The non-transistors computer recordable-type medium of claim 9, wherein said program code configured for reducing said firewall decision diagram further includes:

program code for, in response to a determination that a first node includes only one outgoing branch and a plurality of incoming branches and said one outgoing branch is an incoming branch of a second node, removing said first node and reassigning said plurality of incoming branches from said first node to said second node;

program code for, in response to a determination that said firewall decision diagram includes a first branch $e_0$ and a second branch $e_j$ that are outgoing branches of said first node and incoming branches of said second node, removing said first branch and labeling said second branch equal to an integer set $I(e_o) \cup I(e_j)$, where $I(e_o) \cup I(e_j)$ are integer sets that labeled said first branch and said second branch; and program code for, in response to a determination that said firewall decision diagram includes a first isomorphic node and a second isomorphic node, removing said first isomorphic node and outgoing branches associated with said first isomorphic node and assigning a plurality of incoming branches associated with said first isomorphic node to said second isomorphic node, wherein said first isomorphic node and said second isomorphic nodes are terminal nodes with identical labels or non-terminal nodes with one-to-one correspondence between an outgoing branch of said first isomorphic node and an outgoing branch of said second isomorphic node such that each pair of corresponding branches include identical labels and are incoming branches of a third node in said firewall decision diagram.

\* \* \* \* \*